(12) United States Patent
Watanabe et al.

(10) Patent No.: US 7,705,541 B2
(45) Date of Patent: Apr. 27, 2010

(54) LIGHT CONTROL CIRCUIT

(75) Inventors: Minoru Watanabe, Fukushima-ken (JP); Mitsuru Kano, Fukushima-ken (JP); Minoru Fujiwara, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 401 days.

(21) Appl. No.: 11/853,157

(22) Filed: Sep. 11, 2007

(65) Prior Publication Data
US 2008/0067942 A1  Mar. 20, 2008

(30) Foreign Application Priority Data
Sep. 19, 2006  (JP) .............................. 2006-252545

(51) Int. Cl.
*H05B 37/02* (2006.01)
(52) U.S. Cl. .................. 315/150; 315/151; 315/307; 345/102
(58) Field of Classification Search .......... 315/158, 315/159, 156, 157, 149, 307, 151, 150; 345/102, 345/103, 101, 100, 104
See application file for complete search history.

(56) References Cited

U.S. PATENT DOCUMENTS 7,295,180 B2 * 11/2007 Ichikawa et al. ............ 345/102
2006/0022616 A1 * 2/2006 Furukawa et al. ........... 315/309

FOREIGN PATENT DOCUMENTS

JP  10-191467   7/1998
JP  2001-254128  3/2003

* cited by examiner

*Primary Examiner*—David Hung Vu
(74) *Attorney, Agent, or Firm*—Brinks Hofer Gilson & Lione

(57) ABSTRACT

An illuminance sensor is formed as a current output type sensor that outputs a current which increases or decreases in an analog manner corresponding to an increasing or decreasing change of the illuminance. A light-emitting device is connected with a detection resistor that detects a current flowing through a light-emitting device. A driving control circuit has a light-emitting device driver that outputs to the light-emitting device a voltage for holding a voltage, which is obtained when a current flowing through the light-emitting device and a current detected by the illuminance sensor flows through the detection resistor, in a predetermined value all the time. The light-emitting device emits a large amount of light in a dark place and emits a small amount of light in a bright place.

3 Claims, 3 Drawing Sheets

LIGHT CONTROL CIRCUIT

CLAIM OF PRIORITY

This application claims benefit of the Japanese Patent Application No. 2006-252545 filed on Sep. 19, 2006, which is hereby incorporated by reference.

BACKGROUND

1. Field of the Invention

The present invention relates to a light control circuit, and in particular, to a light control circuit suitable for a brightness control of a lighting device that illuminates a liquid crystal device.

2. Description of the Related Art

In general, in a liquid crystal device used as an image display unit of a mobile phone or the like, a lighting device that illuminates a liquid crystal device is provided and the brightness of a screen is controlled corresponding to the surrounding brightness.

Various kinds of light control devices for the brightness control have been proposed (for example, see JP-A-10-191467 and JP-A-2003-68480).

A known light control device disclosed in JP-A-10-191467 is formed as shown in FIG. 5, for example. Referring to FIG. 5, an illuminance level detected by an illuminance sensor 21 formed using a phototransistor or the like is output, as a change of a voltage through a resistor 22 for current/voltage conversion, to an A/D converter 24. Then, a voltage value, which is an analog value, input to the A/D converter 24 is converted into a digital value and output to a control circuit 25. The control circuit 25 calculates the brightness of a lighting device 27 corresponding to an input voltage value and calculates the brightness of a light-emitting diode 28, which is to emit light in the lighting device 27, and converts the calculated brightness into, for example, a PWM signal and outputs the converted signal to a driving circuit 26. A plurality of light-emitting diodes (only one light-emitting diode is illustrated in FIG. 5) that form the lighting device 27 are connected to the driving circuit 26. In addition, the driving circuit 26 outputs a driving signal corresponding to the brightness of the light-emitting diodes to emit light, which is output from the control circuit 25, in order to cause the light-emitting diodes to emit light. Moreover, when the illuminance level detected by the illuminance sensor 21 changes, each constituent part operates corresponding to the change, such that the light-emitting diodes emit light in the brightness corresponding to the illuminance level.

However, this know device has the following problems. Since an output of the illuminance sensor 21 is A/D converted and is read in a digital manner, the brightness of the lighting device changes in a stepwise manner according to the brightness of surrounding light, as shown in FIG. 6. As a result, the eyes feel very uncomfortable.

Further, this device also has a disadvantage in that flickering occurs near the threshold of the A/D converter 24, for example, in an 'a' portion of FIG. 6 due to the change of the brightness of the lighting device. In order to solve the problem, if a gray-scale level in the light control is increased, the flickering is reduced. In this case, however, the size of a circuit increases. As a result, the cost increases.

Furthermore, in the case when a period of a PWM output to the lighting device is long, flickering has occurred. In order to solve the problem, if the period of the PWM is made short, the flickering is reduced. In this case, however, a clock period should be short. As a result, there has been a problem in that the power consumption of a control circuit increases due to the high-speed clock. In addition, in the case when the PWM period is made short, it has been difficult to minutely control the duty.

Moreover, the surrounding brightness ranges from several lux in a dark room to several hundreds and thousands lux in the case of sunlight. That is, the dynamic range is very large. Accordingly, in the case when the surrounding brightness is controlled in the digital manner in the same manner as in the related art, a large dynamic range is required for a read circuit of an illuminance sensor and a driving circuit of a lighting device. As a result, there has been a problem in that the circuit size increases.

In addition, a liquid crystal device includes a reflective LCD or a transflective LCD in which reflection weighs and a transmissive LCD or a transflective LCD in which transmission weighs that is opposite to the reflective LCD or the transflective LCD in which reflection weighs. A lighting device that needs the reflective LCD or the transflective LCD in which reflection weighs is a lighting device that emits a large amount of light in a dark place and emits a small amount of light in a bright place. A lighting device that needs the transmissive LCD or the transflective LCD in which transmission weighs is a lighting device that emits a small amount of light in a dark place and emits a large amount of light in a bright place. In the related art, there has been no light control device capable of properly controlling the amount of emitted light in an analog manner in correspondence with the both cases described above.

SUMMARY

According to an aspect of the invention, a light control circuit includes: an illuminance sensor that detects the illuminance of surrounding light; a light-emitting device; and a driving control circuit that controls the amount of emitted light of the light-emitting device corresponding to the illuminance detected by the illuminance sensor so as to cause the light-emitting device to emit light. The illuminance sensor is a current output type sensor that outputs a current which increases or decreases in an analog manner corresponding to an increasing or decreasing change of the illuminance. The light-emitting device is connected with a detection resistor that detects a current flowing through the light-emitting device. The driving control circuit has a light-emitting device driver that outputs to the light-emitting device a voltage for holding a voltage, which is obtained when a current flowing through the light-emitting device and a current detected by the illuminance sensor flows through the detection resistor, in a predetermined value all the time. The light-emitting device emits a large amount of light in a dark place and emits a small amount of light in a bright place.

In the light control circuit described above, the illuminance sensor outputs a current which increases or decreases in an analog manner corresponding to the increasing or decreasing change of the illuminance of surrounding light, and the light-emitting device driver of the driving control circuit outputs to the light-emitting device the voltage for holding a voltage, which is obtained when the current flowing through the light-emitting device and the current detected by the illuminance sensor flows through the detection resistor, in the predetermined value all the time. Accordingly, it is possible to control the amount of light emitted from the light-emitting device in correspondence with the change of surrounding illuminance in an analog manner. In addition, the light-emitting device can emit a large amount of light in a dark place and emit a small amount of light in a bright place. As described above, according to the aspect of the invention, a light control can be made very smoothly. As a result, it becomes very easy to realize a light control in a desired dynamic range without flickering at the time of light emission and a stepwise change of the brightness.

As described above, according to the light control circuit, it is possible to appropriately control the amount of light emitted from the light-emitting device in correspondence with the change of the surrounding illuminance in an analog manner. More specifically, it is possible to achieve excellent effects described above.

DESCRIPTION OF THE EMBODIMENT

Hereinafter, a light control circuit according to an embodiment of the invention will be described with reference to FIGS. 1 to 4B.

Figure 1:
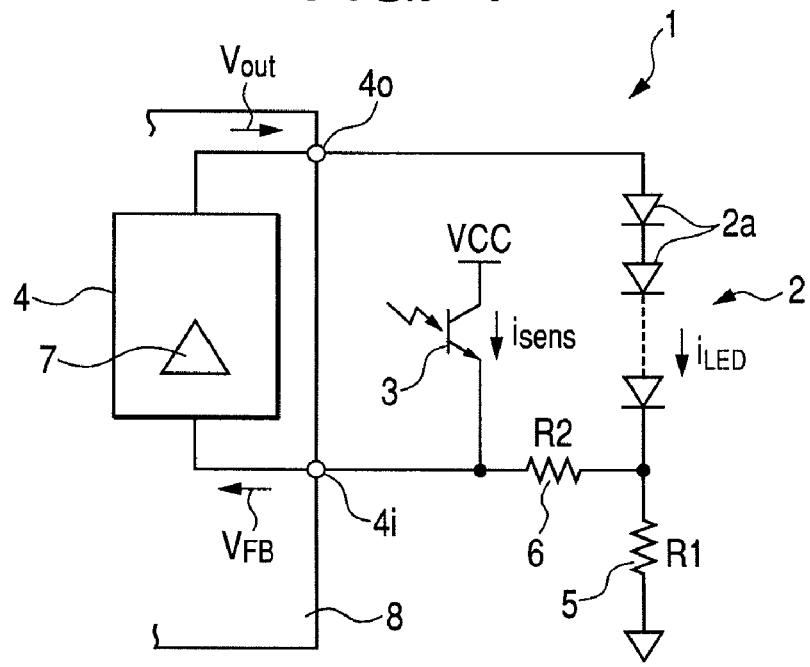
FIG. 1 is a circuit diagram illustrating a light control circuit according to an embodiment

FIG. 1 illustrates the configuration of a circuit according to an embodiment of the invention. A light control circuit according to the present embodiment is a circuit suitable for light control of a lighting device of a liquid crystal device having a reflective LCD or a transflective LCD in which reflection weighs.

A light control circuit 1 according to the present embodiment includes: a light-emitting device 2 in which a plurality of LEDs 2a serving as a luminous body of a lighting device (not shown) are connected in series; an illuminance sensor 3 that detects the illuminance of surrounding light of the lighting device; and a driving control circuit 4 that controls the amount of emitted light of the light-emitting device 2 corresponding to the illuminance detected by the illuminance sensor 3 so as to cause the light-emitting device 2 to emit light. An anode of the LED 2a of the light-emitting device 2 is connected to an output terminal 4o of the driving control circuit 4, and a cathode of the LED 2a of the light-emitting device 2 is connected to a detection resistor 5 used to detect a current $i_{LED}$ flowing through the light-emitting device 2. The illuminance sensor 3 is formed using a current output type phototransistor that outputs a current $i_{sens}$ which increases or decreases in an analog manner corresponding to the increasing or decreasing change of the illuminance. A collector of the illuminance sensor 3 is connected to a power supply Vcc and an emitter of the illuminance sensor 3 is connected to an input terminal 4i of the driving control circuit 4 and connected to the detection resistor 5 with a sensitivity increasing resistor 6, which serves to increase the sensitivity of the output current $i_{sens}$, interposed therebetween. Although the sensitivity increasing resistor 6 is provided in the present embodiment, the sensitivity increasing resistor 6 is not required in the case when the current $i_{sens}$ of the illuminance sensor 3 is so large that the amount of variation can be easily acquired as compared with the current $i_{LED}$ flowing through the light-emitting device 2. In the present embodiment, the sensitivity increasing resistor 6 is provided since the current $i_{LED}$ flowing through the light-emitting device 2 is 15 to 20 mA but the current $i_{sens}$ of the illuminance sensor 3 is 0.01 mA which is very small. The driving control circuit 4 has a light-emitting device driver 7 that outputs to the light-emitting device 2 a voltage $V_{out}$ for holding a voltage $V_{FB}$, which is obtained when the current $i_{LED}$ flowing through the light-emitting device 2 and the current $i_{sens}$ detected by the illuminance sensor 3 flows through the detection resistor 5, in a predetermined value all the time. The light-emitting device driver 7 having the known configuration may be used, or the driving control circuit 4 may be provided in an IC chip 8

Next, an operation of the present embodiment will be described.

First, a case in which the sensitivity increasing resistor 6 is not provided will be described.

In the case of the common light-emitting device driver 7, the current $i_{LED}$ flowing through the light-emitting device 2 flows through the detection resistor 5 (R1), the current $i_{LED}$ is converted into a voltage ($V_{FB}=i_{LED}\times R1$) and the converted voltage is input to the light-emitting device driver 7, and an output voltage $V_{out}$ of the driving control circuit 4 is controlled such that a value of the output voltage $V_{out}$ is always constant.

Then, when the illuminance sensor 3 operates to detect the illuminance of the surrounding light of the lighting device, the detection current $i_{sens}$ is output to flow through the detection resistor 5 (R1). Accordingly, a voltage applied to the light-emitting device driver 7 becomes a total voltage $V_{FB}=(i_{LED}+i_{sens})\times R1$ obtained when the current $i_{LED}$ flowing through the light-emitting device 2 and the current $i_{sens}$ detected by the illuminance sensor 3 flow through the detection resistor 5 (R1). In addition, the light-emitting device driver 7 controls the output voltage $V_{out}$ of the driving control circuit 4 such that a value of the total voltage $V_{FB}=(i_{LED}+i_{sens})\times R1$ is always constant, thereby causing the light-emitting device 2 to emit light.

Next, a case in which the sensitivity increasing resistor 6 is provided will be described.

In the case when the sensitivity increasing resistor 6 is provided, a voltage applied to the light-emitting device driver 7 becomes a total voltage $V_{FB}=(i_{LED}+i_{sens})\times R1+i_{sens}\times R2$ of a total voltage $(i_{LED}+i_{sens})\times R1$ obtained when the current $i_{LED}$ flowing through the light-emitting device 2 and the current $i_{sens}$ detected by the illuminance sensor 3 flow through the detection resistor 5 (R1) and a voltage $i_{sens}\times R2$ obtained when the current $i_{sens}$ detected by the illuminance sensor 3 flows through the sensitivity increasing resistor 6 (R2). In addition, the light-emitting device driver 7 controls the output voltage $V_{out}$ of the driving control circuit 4 such that a value of the total voltage $V_{FB}=(i_{LED}+i_{sens})\times R1+i_{sens}\times R2$ is always constant, thereby causing the light-emitting device 2 to emit light.

Figure 2A:
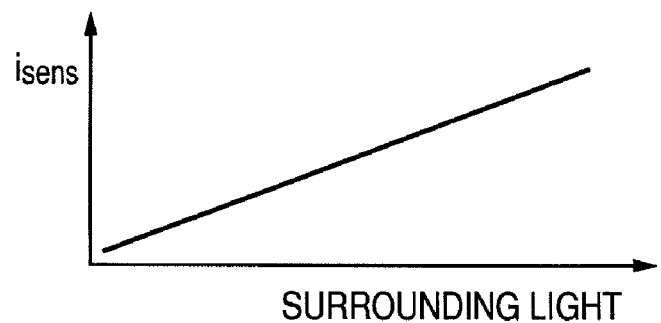
FIG. 2A is a view illustrating a characteristic in the embodiment shown in FIG. 1, more specifically, a characteristic view illustrating the relationship between the intensity of surrounding light and an output of an illuminance sensor.
Figure 2B:
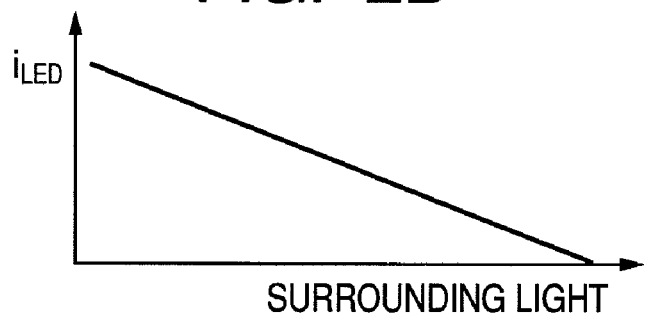
FIG. 2B is a view illustrating a characteristic in the embodiment shown in FIG. 1, more specifically, a characteristic view illustrating the relationship between the intensity of the surrounding light and an output of a light-emitting device.

At this time, the current $i_{sens}$ of the illuminance sensor 3 increases in direct proportion and analog manner as the illuminance of surrounding light increases, as shown in FIG. 2A. In addition, as shown in FIG. 2B, the amount of light emitted from the light-emitting device 2 is large when the illuminance of surrounding light is low and increases in the direct proportion and analog manner as the illuminance of the surrounding light increases.

Thus, a light control is made such that the light-emitting device 2 emits a large amount of light in a place where the illuminance detected is low and emits a small amount of light in a place where the illuminance detected is high.

In a lighting device, to which the present embodiment is applied, of a liquid crystal device having a reflective LCD or a transflective LCD in which reflection weighs, it is common that a light-emitting device is disposed as a front light in the reflective LCD and a light-emitting device is disposed as a backlight in the transflective LCD. In addition, the amount of light of the lighting device needs to be sufficient in a dark place, but the amount of light of the lighting device does not need to be sufficient in a bright place as much as that in the case of the dark place because there is reflected light due to outside light in the bright place. Therefore, the light control in the present embodiment is performed to satisfy the necessity described above.

Further, in the light control circuit 1 according to the present embodiment, it is possible to control the amount of light emitted from the light-emitting device 2 corresponding to change of the surrounding illuminance in an analog manner, such that the light-emitting device 2 can emit a large amount of light in a place where the illuminance detected is low and emit a small amount of light in a place where the illuminance detected is high. Accordingly, the light control can be smoothly made. As a result, unlike the related art, flickering does not occur at the time of light emission, the brightness does not change in a stepwise manner, and it becomes so easy to realize light control in a desired dynamic range.

Furthermore, in the present embodiment, a read circuit of an illuminance sensor that has been needed in the related art, for example, an A/D converter is not required. As a result, the circuit configuration can be simplified.

In addition, a light control operation for appropriately controlling the sensitivity of the illuminance sensor 3 can be performed by providing the sensitivity increasing resistor 6.

Figure 3:
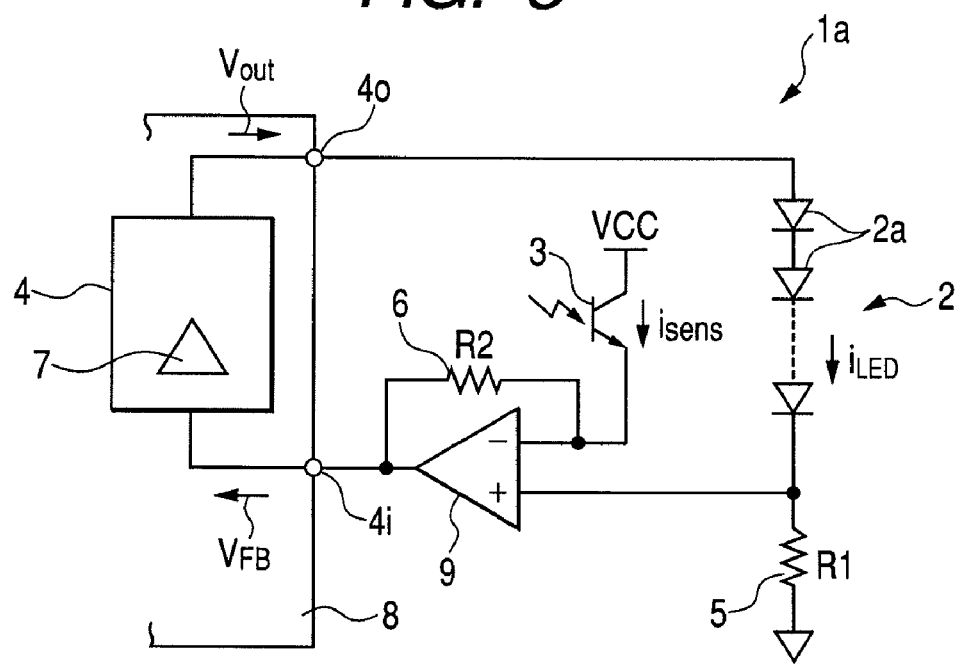
FIG. 3 is a circuit diagram illustrating a light control circuit according to another embodiment

FIG. 3 illustrates the configuration of a circuit according to another embodiment. A light control circuit according to the present embodiment is a circuit suitable for light control of a lighting device of a liquid crystal device having a transmissive LCD or a transflective LCD in which transmission weighs. The same components as in the embodiment shown in FIG. 1 are denoted by the same reference numerals.

A light control circuit 1a according to the present embodiment includes: a light-emitting device 2 in which a plurality of LEDs 2a serving as a luminous body of a lighting device (not shown) are connected in series; an illuminance sensor 3 that detects the illuminance of surrounding light of the lighting device; and a driving control circuit 4 that controls the amount of emitted light of the light-emitting device 2 corresponding to the illuminance detected by the illuminance sensor 3 so as to cause the light-emitting device 2 to emit light. An anode of the LED 2a of the light-emitting device 2 is connected to an output terminal 4o of the driving control circuit 4, and a cathode of the LED 2a of the light-emitting device 2 is connected to a detection resistor 5 used to detect a current $i_{LED}$ flowing through the light-emitting device 2. A connection point between the light-emitting device 2 and the detection resistor 5 is connected to a plus terminal of an operational amplifier 9. The illuminance sensor 3 is formed using a current output type phototransistor that outputs a current $i_{sens}$ which increases or decreases in an analog manner corresponding to the increasing or decreasing change of the illuminance. A collector of the illuminance sensor 3 is connected to a power supply Vcc and an emitter of the illuminance sensor 3 is connected to a minus terminal of the operational amplifier 9 and connected to an output terminal of the operational amplifier 9 with a sensitivity increasing resistor 6, which serves to increases the sensitivity of the output current $i_{sens}$, interposed therebetween. The output terminal of the operational amplifier 9 is connected to an input terminal 4i of the driving control circuit 4. The driving control circuit 4 has a light-emitting device driver 7 that outputs to the light-emitting device 2 a voltage $V_{out}$ for holding a voltage $V_{FB}$, which is a difference between a voltage ($i_{LED}\times R1$) obtained when the current $i_{LED}$ flowing through the light-emitting device 2 flows through the detection resistor 5 and a voltage ($i_{sens}\times R2$) obtained when the current $i_{sens}$ detected by the illuminance sensor 3 flows through the sensitivity increasing resistor 6, in a predetermined value all the time. The light-emitting device driver 7 having the known configuration may be used, or the driving control circuit 4 may be provided in an IC chip 8.

Next, an operation of the present embodiment will be described.

The voltage ($i_{LED}\times R1$) obtained when the current $i_{LED}$ flowing through the light-emitting device 2 flows through the detection resistor 5 (R1) is input to the plus terminal of the operational amplifier 9.

When the illuminance sensor 3 operates to detect the illuminance of surrounding light of the lighting device, the detection current $i_{sens}$ flows through is output to flow through the sensitivity increasing resistor 6 (R2). Then, the voltage ($i_{sens}\times R2$) obtained as the result is input to the minus terminal of the operational amplifier 9.

Figure 4A:
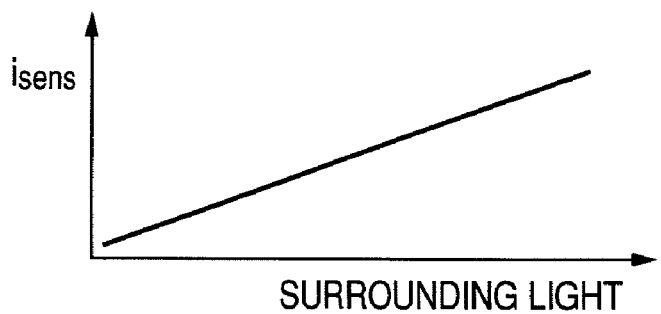
FIG. 4A is a view illustrating a characteristic in the embodiment shown in FIG. 3, more specifically, a characteristic view illustrating the relationship between the intensity of surrounding light and an output of an illuminance sensor.
Figure 4B:
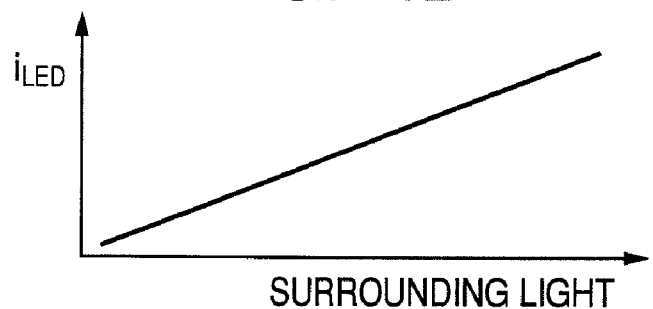
FIG. 4B is a view illustrating a characteristic in the embodiment shown in FIG. 3, more specifically, a characteristic view illustrating the relationship between the intensity of the surrounding light and an output of a light-emitting device.
Figure 5:
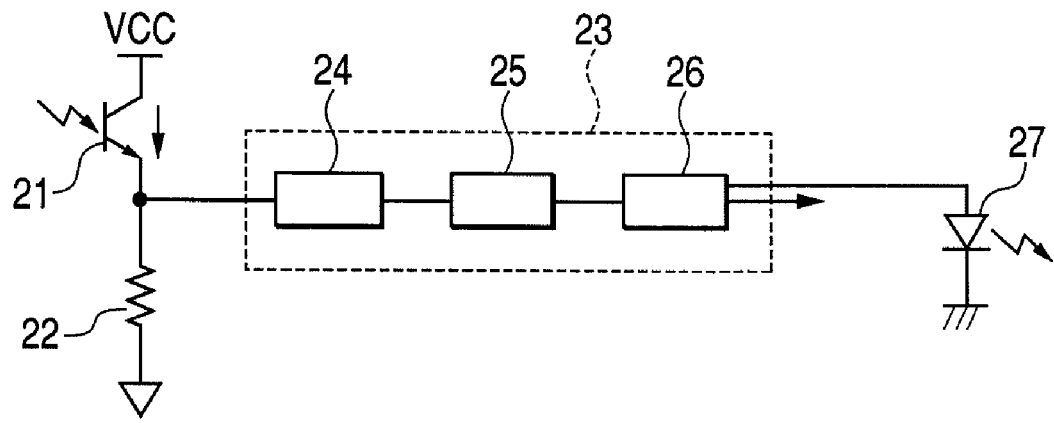
FIG. 5 is a circuit diagram illustrating an example of a known light control circuit.
Figure 6:
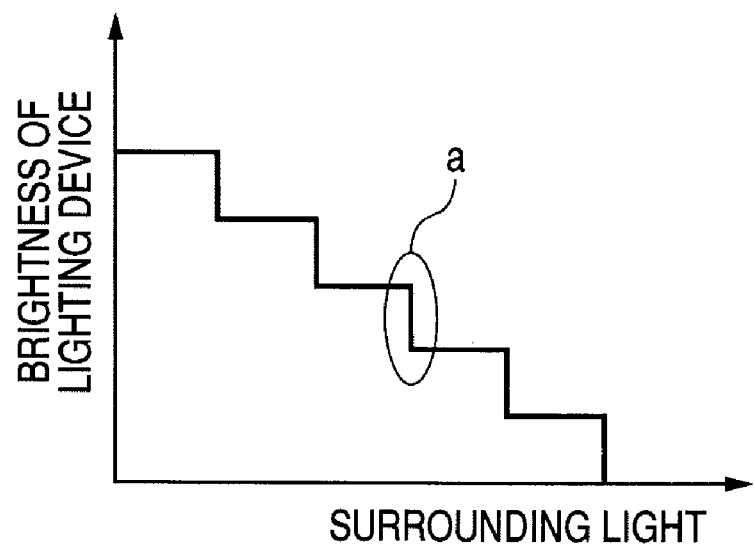
FIG. 6 is a view illustrating a characteristic in a known light control circuit, more specifically, a characteristic view illustrating the relationship between the intensity of surrounding light and an output of a light-emitting device.

The operational amplifier 9 outputs to the light-emitting device driver 7 of the driving control circuit 4 the voltage ($V_{FB}=i_{LED}\times R1-i_{sens}\times R2$), which is a difference between the voltage ($i_{LED}\times R1$) obtained when the current $i_{LED}$ flowing through the light-emitting device 2 flows through the detection resistor 5 (R1) and the voltage ($i_{sens}\times R2$) obtained when the current $i_{sens}$ is output and flows through the sensitivity increasing resistor 6 (R2). The light-emitting device driver 7 controls the output voltage $V_{out}$ of the driving control circuit 4 such that a value of the differential voltage ($V_{FB}=i_{LED}\times R1-i_{sens}\times R2$) is constant all the time, thereby causing the light-emitting device 2 to emit light. At this time, the current $i_{sens}$ of the illuminance sensor 3 increases in direct proportion and analog manner as the illuminance of surrounding light increases, as shown in FIG. 4A. In addition, as shown in FIG. 4B, the amount of light emitted from the light-emitting device 2 is small when the illuminance of surrounding light is low and increases in the direct proportion and analog manner as the illuminance of the surrounding light increases.

Thus, a light control is made such that the light-emitting device 2 emits a small amount of light in a place where the illuminance detected is low and emits a large amount of light in a place where the illuminance detected is high.

In a lighting device, to which the present embodiment is applied, of a liquid crystal device having a transmissive LCD or a transflective LCD in which transmission weighs, it is common that a light-emitting device is disposed as a backlight. In addition, as for the amount of light in the lighting device, it is necessary that the amount of light is small in a dark place and the amount of light is large in a bright place. Therefore, the light control in the present embodiment is performed to satisfy the necessity described above.

Other operations are performed in the same manner as in the embodiment described above.

In addition, the invention is not limited to only the above embodiment, but various modifications may be made as needed.

What is claimed is:

1. A light control circuit comprising:
an illuminance sensor that detects the illuminance of surrounding light;
a light-emitting device; and
a driving control circuit that controls the amount of emitted light of the light-emitting device corresponding to the illuminance detected by the illuminance sensor so as to cause the light-emitting device to emit light,
wherein the illuminance sensor is a current output type sensor that outputs a current which increases or decreases in an analog manner corresponding to an increasing or decreasing change of the illuminance,
the light-emitting device is connected with a detection resistor that detects a current flowing through the light-emitting device,
the driving control circuit has a light-emitting device driver that outputs to the light-emitting device a voltage for holding a voltage, which is obtained when a current flowing through the light-emitting device and a current detected by the illuminance sensor flows through the detection resistor, in a predetermined value all the time, and
the light-emitting device emits a large amount of light in a dark place and emits a small amount of light in a bright place.

2. The light control circuit according to claim 1,
wherein the illuminance sensor is connected with a sensitivity increasing resistor that increases the sensitivity of an output current, and
the light-emitting device driver to outputs to the light-emitting device a voltage for holding a sum of a voltage, which is obtained when the current flowing through the light-emitting device and the current detected by the illuminance sensor flows through the detection resistor, and a voltage, which is obtained when the current detected by the illuminance sensor flows through the sensitivity increasing resistor, in a predetermined value all the time.

3. A light control circuit comprising:
an illuminance sensor that detects the illuminance of surrounding light;
a light-emitting device; and
a driving control circuit that controls the amount of emitted light of the light-emitting device corresponding to the illuminance detected by the illuminance sensor so as to cause the light-emitting device to emit light,
wherein the illuminance sensor is a current output type sensor that outputs a current, which increases or decreases in an analog manner corresponding to an increasing or decreasing change of the illuminance, and is connected with a sensitivity increasing resistor that increases the sensitivity of an output current,
the light-emitting device is connected with a detection resistor that detects a current flowing through the light-emitting device,
the driving control circuit has a light-emitting device driver that outputs to the light-emitting device a voltage for holding a difference between a voltage, which is obtained when a current flowing through the light-emitting device flows through the detection resistor, and a voltage, which is obtained when a current detected by the illuminance sensor flows through the sensitivity increasing resistor, in a predetermined value all the time, and
the light-emitting device emits a small amount of light in a dark place and emits a large amount of light in a bright place.

* * * * *